United States Patent [19]

Denyer

[11] Patent Number: 5,690,377
[45] Date of Patent: Nov. 25, 1997

[54] RETRACTABLE COVER SYSTEM FOR A TRUCK TRAILER BODY

[76] Inventor: David Keith Denyer, 6 Supply Court, Albion Park, New South Wales, 2527, Australia

[21] Appl. No.: 579,046

[22] Filed: Dec. 21, 1995

[30] Foreign Application Priority Data

| Jan. 30, 1995 | [AU] | Australia | 11446/95 |
| Mar. 13, 1995 | [AU] | Australia | 14809/95 |
| Apr. 28, 1995 | [NZ] | New Zealand | 272008 |

[51] Int. Cl.⁶ .................................................. B62D 25/06
[52] U.S. Cl. ........................................ 296/100; 296/101
[58] Field of Search ................................. 296/100, 101

[56] References Cited

U.S. PATENT DOCUMENTS

| 1,718,183 | 6/1929 | Smith | 296/100 X |
| 3,138,399 | 6/1964 | Hughes | 296/100 |
| 3,756,650 | 9/1973 | Michel | 296/100 |
| 4,215,897 | 8/1980 | Aiken et al. | 296/100 |
| 4,854,630 | 8/1989 | Biancale | 296/100 |
| 4,858,984 | 8/1989 | Weaver | 296/100 |
| 5,050,923 | 9/1991 | Petelka | 296/100 X |
| 5,067,767 | 11/1991 | Biancale | 296/100 |
| 5,080,423 | 1/1992 | Merlot et al. | 296/100 X |
| 5,102,182 | 4/1992 | Haddad et al. | 296/100 |
| 5,145,230 | 9/1992 | Biancale | 296/100 |
| 5,253,914 | 10/1993 | Biancale | 296/100 |
| 5,429,408 | 7/1995 | Henning et al. | 296/100 |

*Primary Examiner*—Joseph D. Pape
*Attorney, Agent, or Firm*—Abelman, Frayne & Schwab

[57] ABSTRACT

A retractable cover system for a tipper trailer body (11) of a truck includes a cover (30) for the top of the trailer body (11), and a winder pulley (52) for controlling the movement of the cover (30) across the top of the trailer body (11). An endless cable (53) which connects to the cover (30), has its movement controlled by the winder pulley (52) and a plurality of support pulleys (44, 45, 46, 47, 48, 59, 60) also support the movement of the endless cable (53). The arrangement of the support pulleys (44 to 48, 59, 60) and endless cable (53) is such that by operation of the winder pulley (52), the cover is retractably moved over the top of the trailer body (11).

2 Claims, 4 Drawing Sheets

RETRACTABLE COVER SYSTEM FOR A TRUCK TRAILER BODY

FIELD OF INVENTION

The present invention relates to a retractable cover system for a truck trailer body and, in particular, to a retractable tarpaulin cover that may be operated by manipulation of a single winder pulley and endless cable arrangement to cover a trailer body of a truck.

BACKGROUND ART

Conventional truck trailer bodies used in the transport of sand, gravel and other cargo of loose material are of an open frame construction whereby the top of the trailer body is open. Such open trailer bodies, also known as tipper trailers, have obvious disadvantages during unfavourable weather conditions, such as during rain and strong winds, and contribute to a considerable drag on the movement of the truck by the wind resistance of the open frame.

Various attempts have been made in the past to cover the tipper trailers so as to reduce the drag and protect the cargo. A common approach has been to provide a tarpaulin sheet which can be manually spread across the opening of the tipper trailer and then secured firmly in position by rope or the like. This approach requires considerable manual effort in that the operator must firstly climb onto the tipper trailer and then pull the tarpaulin across the opening before securing the tarpaulin in position for transport.

The requirement to climb onto the tipper trailer creates the risk of injury to the operator and, particularly in unfavourable weather conditions, such an operation may prove dangerous.

Also an inexperienced operator may incorrectly secure the cover across the opening and this may lead to the cover lifting off the trailer at high speeds, thereby posing risks to other road users.

Even when a tarpaulin cover is secured correctly, continuous vibration of the trailer during transportation may cause loosening of the cover so that wind induced flapping results.

It is an object of the present invention to overcome or substantially ameliorate the disadvantages of the prior art.

SUMMARY OF THE INVENTION

According to the invention, there is provided a retractable cover system for a tipper trailer body of a truck, said retractable cover system comprising:

(a) a cover for the top of the trailer body, (b) an endless cable which is connected to opposed side portions of the cover, (c) a winder pulley for controlling the movement of the cable, and (d) a plurality of support pulleys for supporting the cable, whereby the said endless cable extends continuously between all the support pulleys and winder pulley, the arrangement of the support pulleys and endless cable being such that the operation of the winder pulley causes the simultaneous movement of the opposed side portions of the cover to retractably move the cover over the top of the trailer body.

In a preferred form of the invention, the system includes a means for adjusting the tension of the cable.

Preferably, the cable tension adjustment means comprises a track along which the winder pulley is slidably positioned

2 and means for securing the winder pulley at a desired position along the track.

Preferably, the cover is supported on the top of the trailer body by runner means which are adapted to slide along a track mounted on the trailer body.

The runner means may be bow ends and the track is preferably an open channel, with the bow ends being adapted to slide over an upper surface of the open channel.

DESCRIPTION OF THE PREFERRED EMBODIMENT

Figure 1:
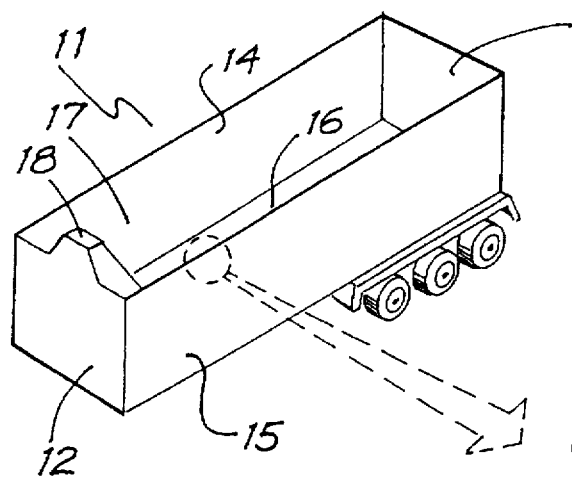
Figure 2:
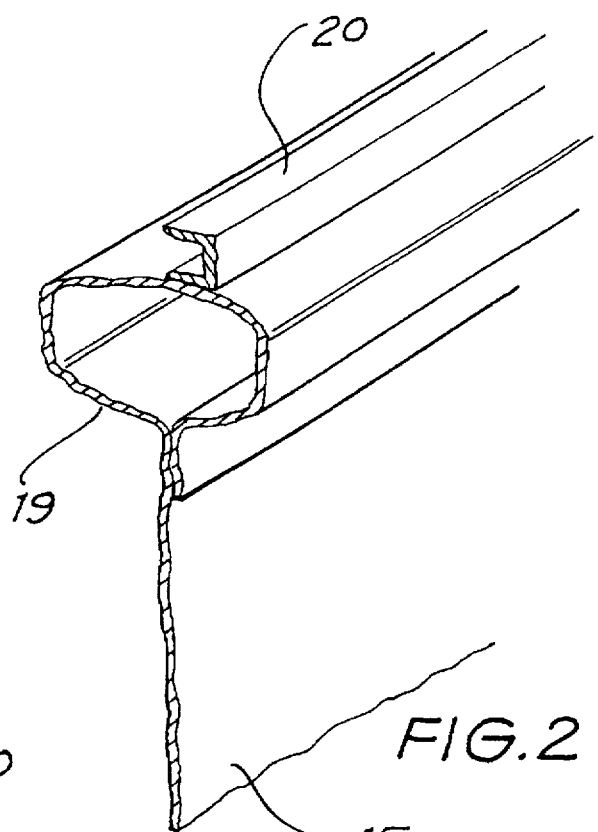
Figure 3:
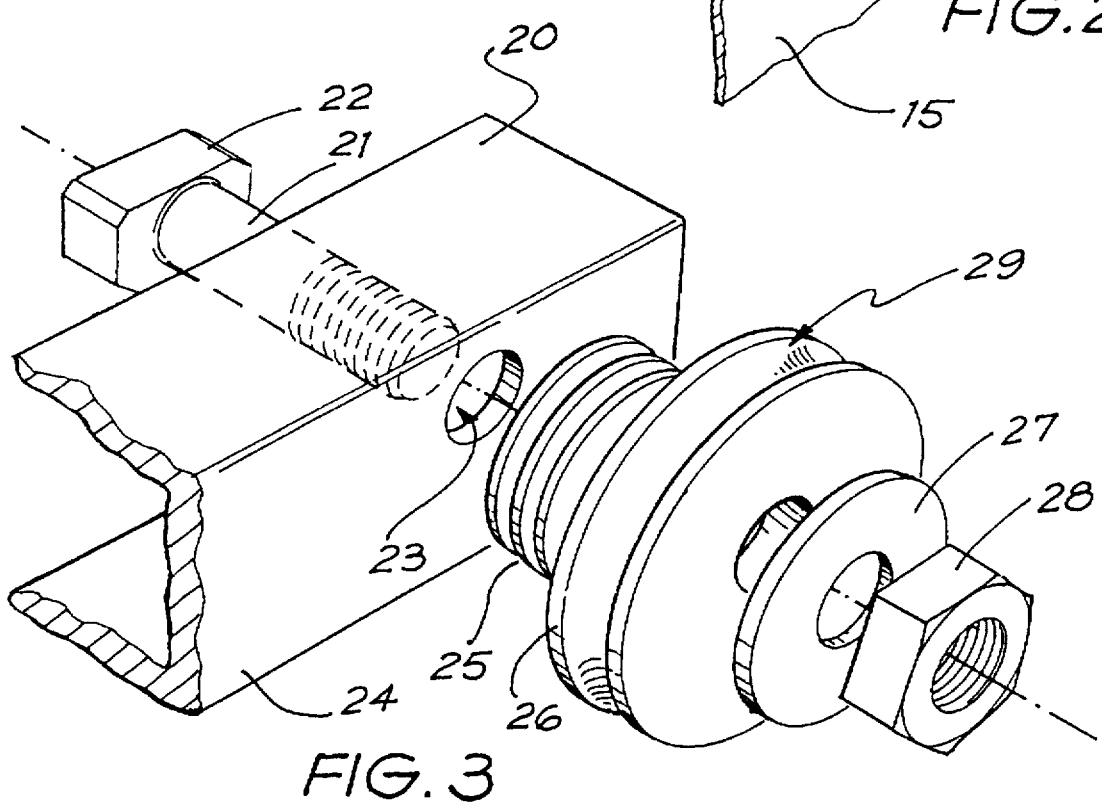
Figure 4:
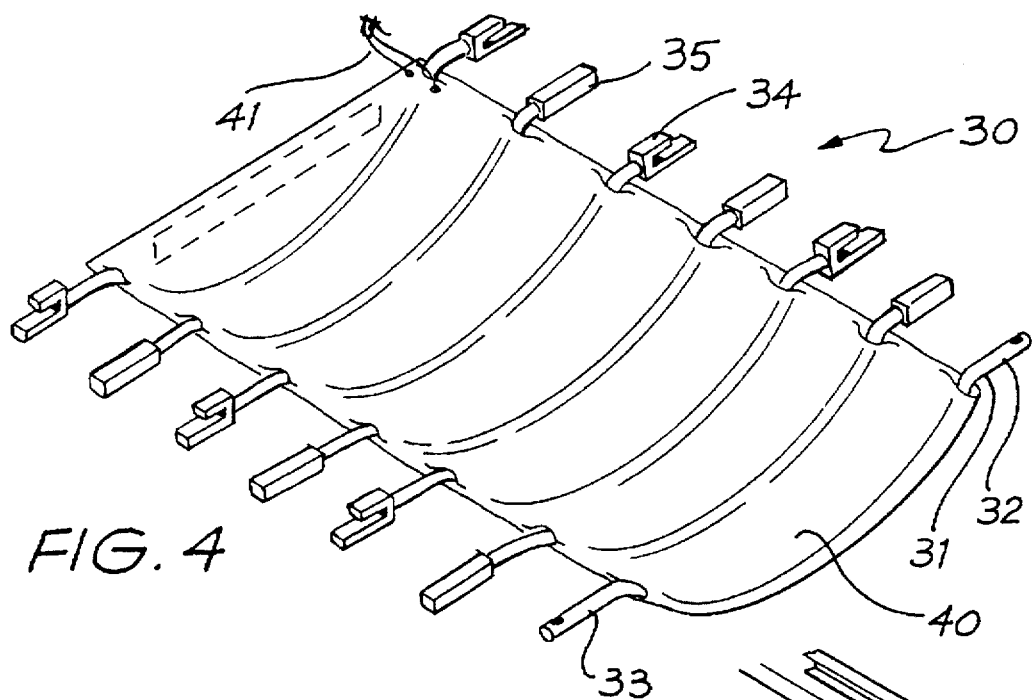
Figure 5:
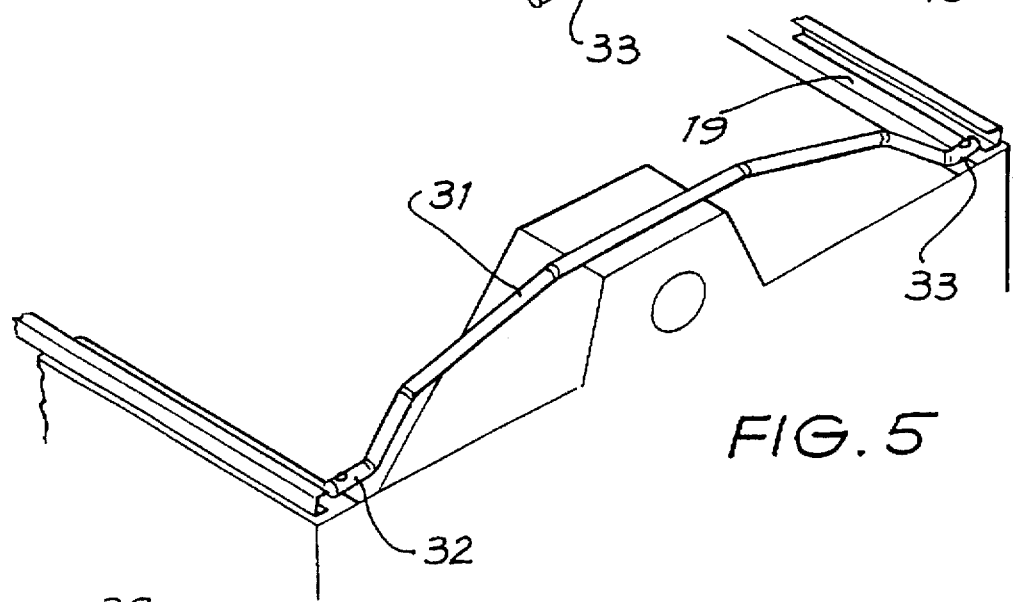
Figure 6:
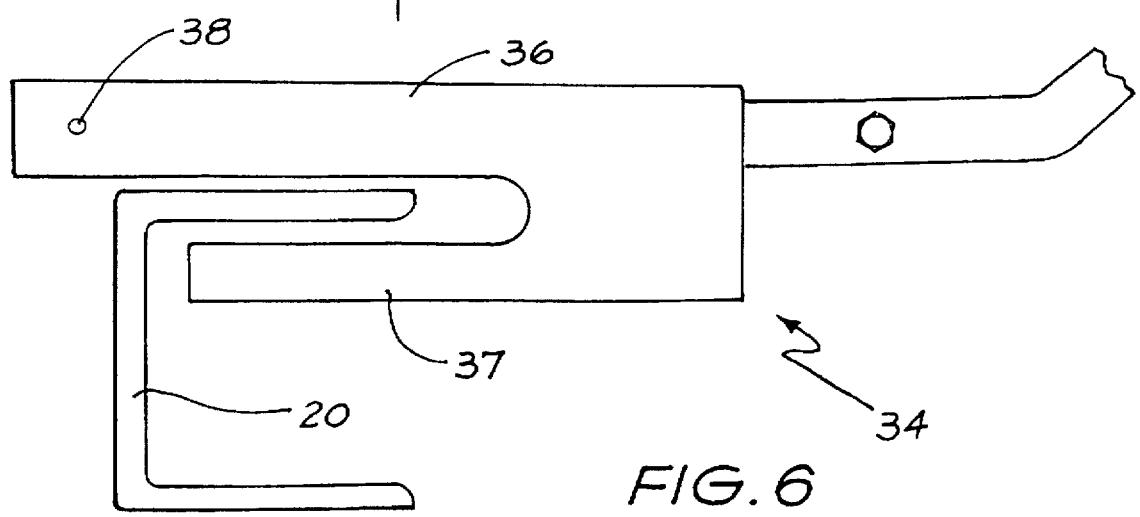
Figure 7:
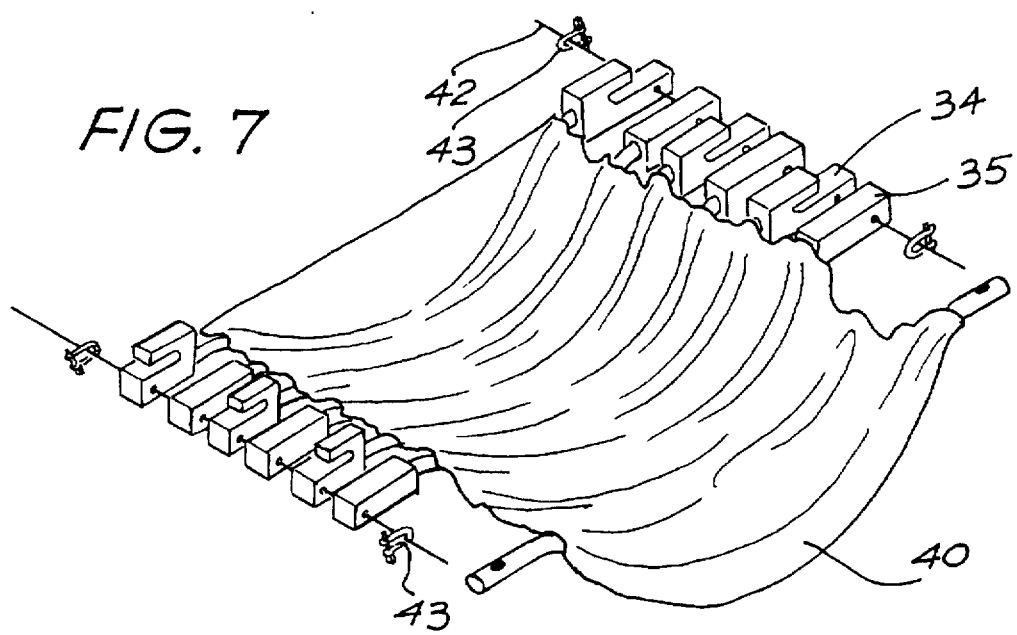
Figure 8:
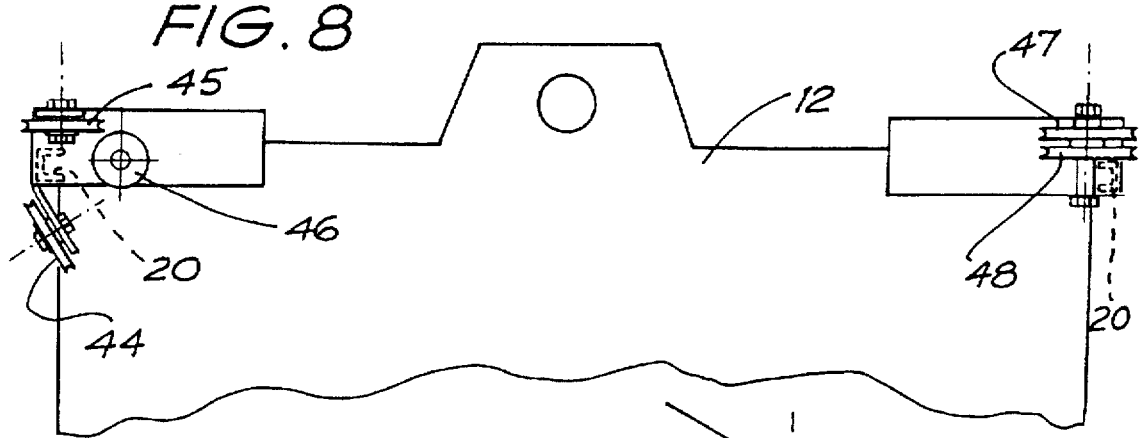
Figure 9:
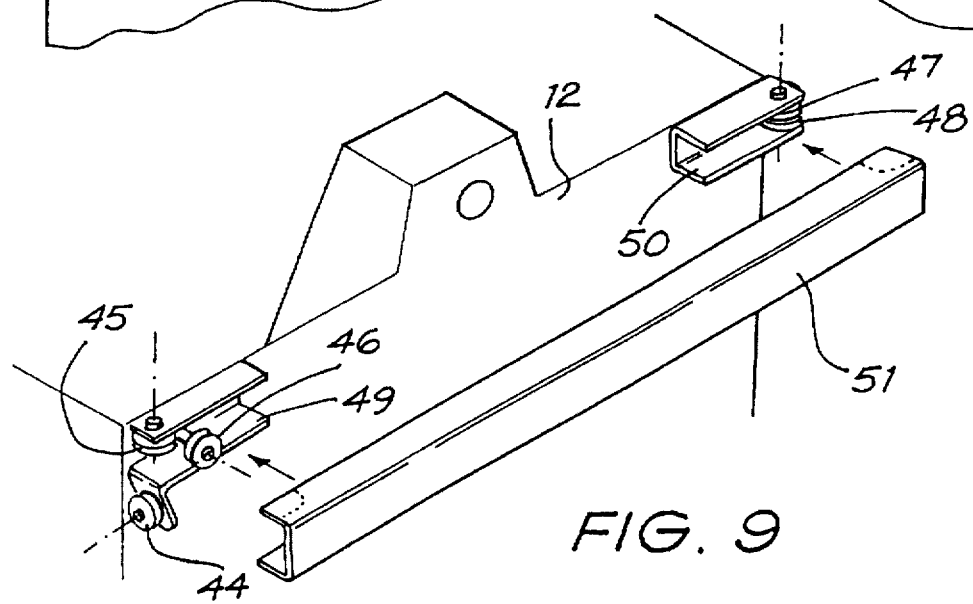
Figure 10:
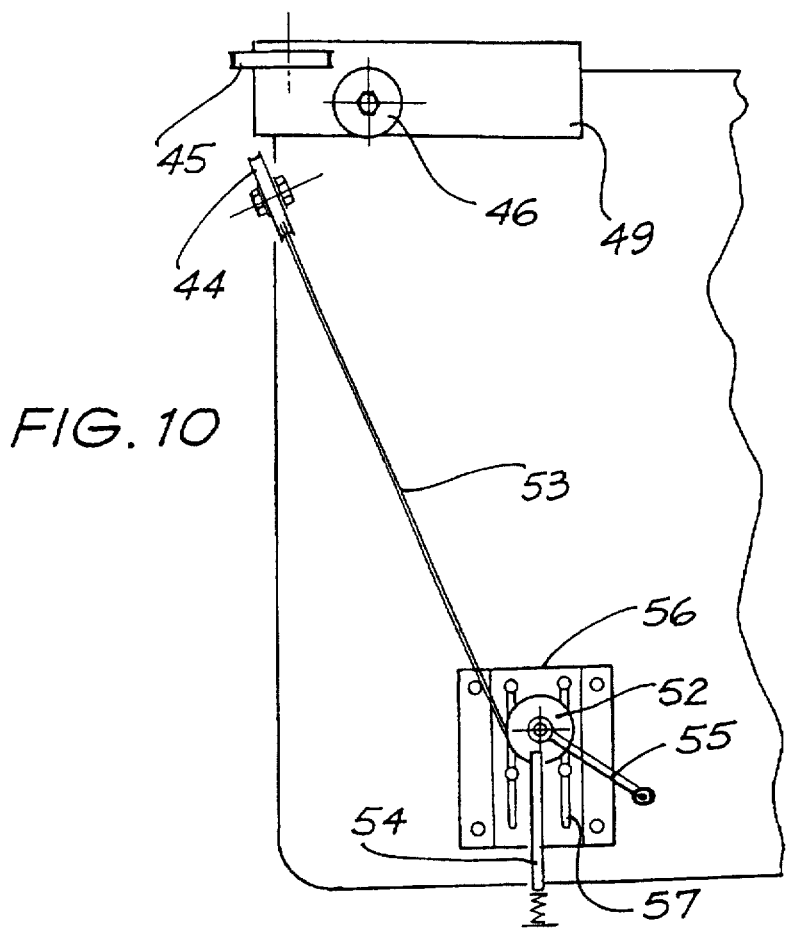
Figure 11:
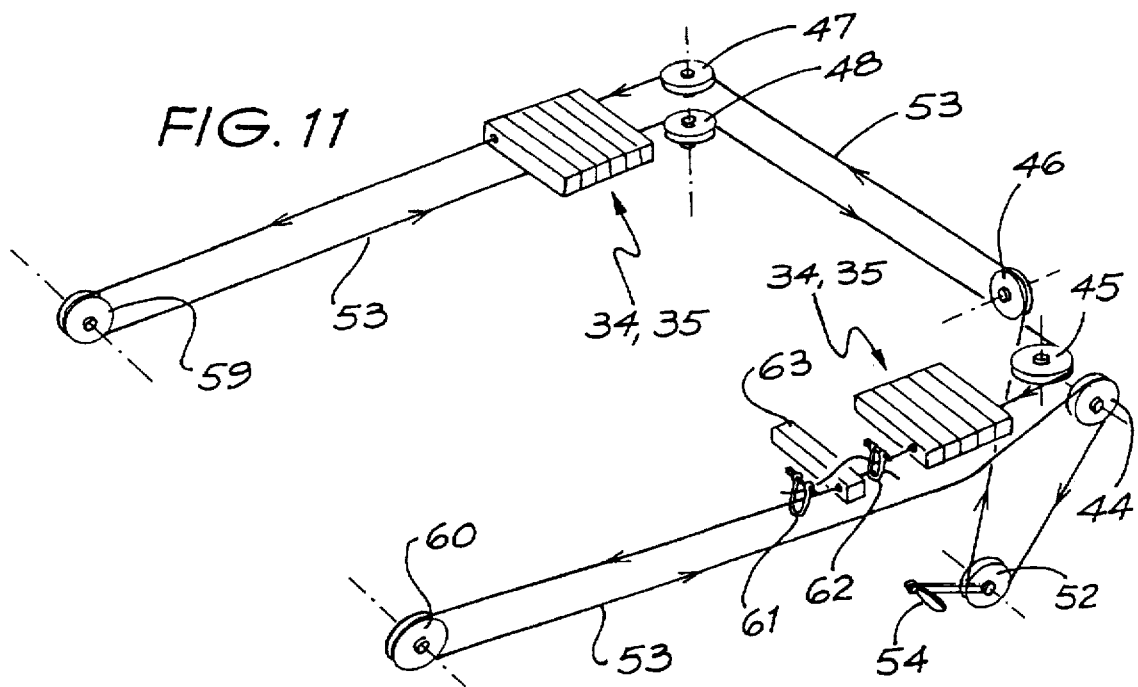

In order that the invention may be more readily understood and put into practical effect, reference will be made to the accompanying drawings, in which:

FIG. 1 is a perspective view of a tipper trailer body of the type to which the retractable cover system of the invention may be mounted, FIG. 2 is a partly broken away perspective view of the top of one of the side walls of the trailer body of FIG. 1 showing a preferred channel track for the retractable cover system of the invention, FIG. 3 is a partly broken away perspective view of the rear end of the channel track of FIG. 2 and an exploded view of a support pulley arrangement connected thereto, FIG. 4 is a perspective view of the underside of a preferred cover for the retractable cover system of the invention, FIG. 5 is a perspective view of the front bow of the cover of FIG. 4 engaging the front end of the channel track of FIG. 2, FIG. 6 is a side view of a preferred bow end for slidably engaging the cover of FIG. 4 to the channel track of FIG. 2, FIG. 7 is a perspective view of the cover of FIG. 4 being inserted onto an endless cable for the retractable cover system of the invention, FIG. 8 is an elevational view of the top of the outer front wall of the trailer body of FIG. 1 showing part of a preferred arrangement of support pulleys for the retractable cover system of the invention, FIG. 9 is a perspective view of a front cover channel being located over the support pulleys shown in FIG. 8, FIG. 10 is a partly broken away elevational view of the outer front wall of the trailer body of FIG. 1 showing a preferred winder pulley and cable tension adjustment means, and FIG. 11 is an isolated perspective view of the preferred arrangement of winder pulley, support pulleys and cable (with attached bows) that control the movement of the cover of FIG. 4 over the top of the trailer body of FIG. 1.

The conventional tipper trailer body 11 shown in FIG. 1 has a front end wall 12, a rear end wall 13 and opposed side walls 14 and 15 rising from a floor 16 and providing an opening 17 at the top of the body 11. The tipper mechanism (not shown) for the body 11 is housed in the structure 18 formed at the front end of the body 11 and is adapted to cooperate with a ram or similar tipping means mounted on the truck (not shown).

As shown in FIG. 2, the upper edge of both of the side walls 14 and 15 consists of a hollow closed channel 19 that extends the full length of each side wall. Welded or otherwise secured to the top of both of the closed channels 19 is an open channel 20, preferably made of aluminium, the opening of which faces horizontally towards the interior of the body 11. The upper surface of the open channel 20, which is horizontal, serves as a track for supporting runner means in the form of bow ends (shown in FIG. 4) for the retractable cover system.

FIG. 3 shows a single support pulley arrangement connected to the channel track 20 adjacent the rear end of both of the side walls 14 and 15.

The support pulley arrangement of FIG. 3 is adapted to support part of an endless cable (shown in FIG. 11) to which the cover of the retractable cover system is connected.

A bolt 21 with a flat cut head 22 is located through a hole 23 in the side wall 24 of the channel track 20. Fitted to the shaft of the bolt 21 that emerges from the hole 23 are, in order, a plurality of spacer washers 25, a pulley wheel 26, a washer 27 and nut 28. The pulley wheel 26 has a circumferential groove 29 into which the endless cable is engaged.

The cover 30 of FIG. 4 is shown upside-down to reveal the framework system of bows that support the cover sheet. Each bow, although substantially hidden by the coversheet in FIG. 4, may be constructed in the shape of a gradual arch or the angular shape shown in FIG. 5.

The cover 30 has a front end bow 31 shown in FIGS. 4 and 5. The front end bow 31 has end portions 32 and 33 which have holes formed therethrough for locating bolts. The bolts (not shown) secure the front end bow 31 to the hollow closed channels 19.

The remaining bows have end portions to which are secured bow end members of two types as shown in FIG. 4, namely lock-down bow ends 34 and block bow ends 35. The lock-down bow ends 34, shown in detail in FIG. 6, are in the form of a channel section having a main body 36 and a tongue 37. The main body 36 is adapted to slide over the upper surface of the channel tracks 20 and the tongue 37 is adapted to lock the bow ends 34 into stable engagement with the channel tracks 20 so as to restrict vertical and horizontal movement of the bows.

The block bow ends 35 are similar to the lock-down bow ends 34 but lack a tongue piece, and so are only adapted to slide over the upper surface of the channel tracks 20. The relative number of lock-down bow ends 34 and block bow ends 35 may vary depending on the length of the trailer body and other factors.

Each bow end 34 and 35 has a cylindrical hole 38 formed therethrough such that, when the bow end is engaged against its channel track, the hole 38 has its axis parallel with the channel track 20. The holes 38 are adapted to receive an endless cable therethrough as shown in FIG. 7.

The cover sheet 40 shown in FIGS. 4 and 7 has a series of sleeves formed from one long side of the sheet to the other. Each sleeve encloses the main bent part of each bow and has bow end portions projecting out of openings to the sleeve adjacent the long sides of the sheet.

Cable ties are fitted through each sleeve so as to engage around the bow when it is enclosed by the sleeve, thereby securing the cover sheet 40 to the bows. FIG. 4 shows one of the cable ties 41 in its fitted position but prior to tightening around the bow at the rear end of the cover. The cover sheet is of a conventional tarpaulin material, such as polyvinylchloride (PVC) and, as shown in FIG. 7, can be readily folded or extended as required.

In FIG. 7, the endless cable 42 has cable clamps 43 attached thereto at each end of the series of movable bows 34 and 35. Preferably the cable 42 is a 5 mm steel rod cable.

FIG. 8 shows five support pulleys 44, 45, 46, 47 and 48 mounted at the top of the outer side of the front end wall 12 of the trailer body. Pulleys 44, 45 and 46 are located on the driver's side of the trailer body. Pulley 44 is mounted at a inclined angle to the vertical (see also FIG. 10), but has its axis of rotation inclined in the direction of a vertical plane. Pulley 45 is mounted such that its axis of rotation is vertical and pulley 46 is mounted such that its axis of rotation is horizontal. Pulleys 47 and 48 are mounted such that they share the same vertical axis of rotation.

Pulleys 45 and 47 are at the same height relative to their respective channel tracks 20. Pulley 48 is at a height that corresponds to the location of the holes 38 in the bow ends as they slide over the channel tracks 20.

As shown in FIG. 9, the pulleys 44, 45 and 46 are mounted on a channel bracket 49, and pulleys 47 and 48 are mounted on a channel bracket 50. Both channel brackets 49 and 50 are bolted to the front end wall 12, and a front cover channel 51 (shown disassembled from the wall 12) is located over both brackets 49 and 50 for protection of the pulleys 44 to 48. The cover channel 51 may have portions thereof cut out so as not to interfere with the operation of the pulleys or the endless cable.

A winder pulley 52, mounted to the outer side of the front end wall 12, is shown in FIG. 10 connected to a cable tension adjustment means. A part of the endless cable 53 is shown engaged between the inclined support pulley 44 and winder pulley 52. The angle of the inclined support pulley 44 is such that the cable 53 follows a line that is tangential to the engaging Groove of the winder pulley 52 and is continuous with the plane of the support pulley 44 as shown in FIG. 10.

The winder pulley 52 has a handle 54 for winding and spring locking means 55 that locks the winder pulley 52 when desired.

The location of the winder pulley 52 may be slidably positioned along a track 57 formed as a pair of slots in the mounting assembly 56 for the winder pulley 52. The winder pulley 52 may be secured at a desired position along the track 57 by such means as locking bolts and so can adjust the tension of the endless cable 53.

FIG. 11 shows a preferred arrangement of support pulleys, endless cable and winder pulley.

There are two support pulleys 59 and 60 at the upper rear end of the side walls 14 and 15 of the trailer body which co-operate with support pulleys 44 to 48 at the upper front end of the trailer body and the winder pulley 52 to engage an endless cable 53 in the manner as shown in FIG. 11. One series of bow ends 34 and 35 is engaged to the portion of cable that extends between support pulleys 59 and 47, and another series of blow ends 34 and 35 is engaged to the cable portion extending between support pulleys 60 and 45.

The cable 53 is made endless by being clamped back on itself at two locations by cable clamps 61 and 62. These locations are on either side of the rearmost bow end 63. Although not shown, the opposed rearmost bow end is also flanked by cable clamps secured to the cable. The obstruction caused by these cable clamps will cause the bow end 63, and therefore its corresponding bow, to move at the same rate as the cable when it is being wound by the winder pulley 52. Movement of the rearmost bow in a direction towards the rear of the trailer will drag the other movable bows (not including the front bow) towards the rear of the trailer until the cover sheet is spread out over the top of the trailer body and there is an even distribution of bows.

With this arrangement, the cover may be retractably moved over the top of the trailer body by operation of the winder pulley. The arrows along cable 53 in FIG. 11 show the direction of its movement as the bow ends are being moved towards the rear of the trailer so as to extend the cover over the trailer top.

Various modifications made be made in details of design and construction without departing from the scope or ambit of the invention.

I claim:

1. A retractable cover system for a tipper trailer body of a truck, said retractable cover system comprising:

(a) a cover for the top of the trailer body, (b) a plurality of movable bows connected to said cover, each movable bow having a guide at each of its opposed ends, (c) a pair of open channel tracks mounted on opposed side walls of the trailer body, each of said guides contacting an upper surface of one of said open channels, (d) an endless linear means for moving said cover which is connected to opposed side portions of the cover, (e) a first rotatable means for controlling the horizontal movement of said cover through Said linear means, (f) a plurality of second rotatable means for supporting said linear means, (g) a mounting assembly for mounting said first rotatable means to a front wall of said trailer body, and (h) a means for adjusting tension of said linear means, said means for adjusting tension being located on said mounting assembly, whereby the said endless linear means extends continuously between all the second rotatable means and said first rotatable means, the arrangement of the plurality of second rotatable means and endless linear means being such that the operation of the first rotatable means causes the simultaneous movement of the opposed side portions of the cover to retractably move the cover over the top of the trailer body.

2. The retractable cover system of claim 1 wherein the means for adjusting tension of said linear means comprises a track along which the first rotatable means is slidably positioned and means for securing the first rotatable means at a desired position along the track.

* * * * *